(12) United States Patent
Jung (10) Patent No.: US 12,056,451 B2
(45) Date of Patent: Aug. 6, 2024

(54) METHOD AND APPARATUS FOR RECOGNIZING SPO TUPLE RELATIONSHIP BASED ON DEEP LEARNING AND SCORE AND PROBABILITY ASSOCIATED WITH A SPO RELATIONSHIP CLASS

(71) Applicant: Electronics and Telecommunications Research Institute, Daejeon (KR)

(72) Inventor: Joon Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 17/546,927

(22) Filed: Dec. 9, 2021

(65) Prior Publication Data

US 2022/0309241 A1    Sep. 29, 2022

(30) Foreign Application Priority Data

Mar. 26, 2021   (KR) .......................... 10-2021-0039604

(51) Int. Cl.
| | | |
|---|---|---|
| *G06F 40/211* | (2020.01) | |
| *G06F 18/22* | (2023.01) | |
| *G06N 3/00* | (2023.01) | |
| *G06N 3/04* | (2023.01) | |
| *G06N 3/08* | (2023.01) | |

(52) U.S. Cl.
CPC ............ *G06F 40/211* (2020.01); *G06N 3/08* (2013.01); *G06F 18/22* (2023.01); *G06N 3/04* (2013.01)

(58) Field of Classification Search
None
See application file for complete search history.

(56) References Cited

U.S. PATENT DOCUMENTS 10,635,753 B2   4/2020   Shin
10,706,218 B2   7/2020   Milward et al.
(Continued)

FOREIGN PATENT DOCUMENTS

EP          3985564 A1 * 10/2020   .............. G06N 3/00
EP        4 030351 A1 *  7/2022   .............. G06N 3/04
(Continued)

*Primary Examiner* — Farzad Kazeminezhad
(74) *Attorney, Agent, or Firm* — William Park & Associates Ltd.

(57) ABSTRACT

Method of recognizing a SPO tuple relationship based on deep learning includes reading a natural language sentence stored in a first storage in which a natural language sentence and an SPO tuple are configured in pairs and stored, generating dependent syntax relationship information by parsing a dependent syntax from the natural language sentence, reading the SPO tuple paired with the natural language sentence stored in the first storage, generating dependent-syntax-based first SPO tuple relationship information for training a deep learning model based on the SPO tuple, the natural language sentence, and the dependent syntax relationship information, performing embedding on the dependent syntax relation information, recognizing second SPO tuple relationship information by inputting the embedded dependent syntax relationship information to a multi-layered bidirectional time series neural network model, and training the deep learning model by comparing the first and second SPO tuple relationship information.

8 Claims, 4 Drawing Sheets

(56) References Cited

U.S. PATENT DOCUMENTS

2020/0117715 A1    4/2020  Lee et al.
2021/0216881 A1*  7/2021  McCarthy ............... G06F 18/22

FOREIGN PATENT DOCUMENTS

| KR | 101768852 B1 | 8/2017 |
| KR | 1020200071877 A | 6/2020 |
| KR | 1020200114919 A | 10/2020 |
| KR | 102191133 B1 | 12/2020 |

* cited by examiner

METHOD AND APPARATUS FOR RECOGNIZING SPO TUPLE RELATIONSHIP BASED ON DEEP LEARNING AND SCORE AND PROBABILITY ASSOCIATED WITH A SPO RELATIONSHIP CLASS

CROSS-REFERENCE TO RELATED APPLICATION

This application claims priority to and the benefit of Korean Patent Application No. 10-2021-0039604, filed on Mar. 26, 2021, the disclosure of which is incorporated herein by reference in its entirety.

BACKGROUND

1. Field of the Invention

The present invention relates to a method and apparatus for recognizing a subject-predicate-object (SPO) tuple relationship based on deep learning.

2. Discussion of Related Art

A large-scale knowledge base includes millions of pieces of knowledge and is mainly used in the field of natural language processing.

The existing constructed large-scale knowledge base needs to be expanded to include new knowledge. In order for recent new knowledge to be efficiently added to the knowledge base, knowledge needs to be automatically extracted from a large amount of recent data, and the extracted knowledge needs to be added to the knowledge base.

Meanwhile, fixed data includes practical and useful information and is effective in extracting knowledge due to its fixed structure. However, among numerous new pieces of data, many pieces of data exist in an unfixed form. Therefore, in order to extract new knowledge, it is necessary to effectively extract knowledge from fixed natural language data.

In order to automatically extract knowledge from a natural language sentence, it is necessary to recognize a subject-predicate-object (SPO) tuple relationship from the natural language sentence. Recently, methods using a deep learning model have been proposed to extract SPO tuple relationship information from natural language sentences. However, the deep learning model with increased accuracy of extracting the SPO tuple relationship from natural language requires a great deal of training data, and the structure of the deep learning model is complicated and sizes of the parameters to be learned are large, and thus, costs consumed to perform the deep learning are high.

Therefore, there is a need for a technology capable of recognizing an SPO tuple relationship from a natural language sentence with high accuracy at a low cost.

RELATED ART DOCUMENT

Patent Document

Korean Patent Laid-Open Publication No. 10-2020-0072593 (Jun. 23, 2020)

SUMMARY OF THE INVENTION

The present invention is directed to providing a method and apparatus for recognizing a subject-predicate-object (SPO) tuple relationship based on deep learning for recognizing the SPO tuple relationship from a natural language sentence with high accuracy using an uncomplicated deep learning model.

However, the problems to be solved by the present invention are not limited to the problems described above, and other problems may be present.

According to an aspect of the present invention, there is provided a method of recognizing an SPO tuple relationship based on deep learning, including: reading a natural language sentence stored in a first storage in which a natural language sentence and an SPO tuple are configured in pairs and stored; parsing a dependent syntax from the natural language sentence to generate generating dependent syntax relationship information; reading the SPO tuple paired with the natural language sentence stored in the first storage; generating dependent-syntax-based first SPO tuple relationship information for training a deep learning model based on the SPO tuple, the natural language sentence, and the dependent syntax relationship information; performing embedding on the dependent syntax relation information; recognizing second SPO tuple relationship information by inputting the embedded dependent syntax relationship information to a multi-layered bidirectional time series neural network model; and training the deep learning model by comparing the first and second SPO tuple relationship information.

According to another aspect of the present invention, there is provided a method of recognizing an SPO tuple relationship based on deep learning, including: reading a natural language sentence stored in a first storage in which a natural language sentence and an SPO tuple are configured in pairs and stored; generating dependent syntax relationship information by parsing a dependent syntax from the natural language sentence; reading the SPO tuple paired with the natural language sentence stored in the first storage; generating dependent-syntax-based first SPO tuple relationship information for training a deep learning model based on the SPO tuple, the natural language sentence, and the dependent syntax relationship information; configuring the dependent syntax relationship information and the first SPO tuple relationship information in pairs and storing the configured dependent syntax relationship information and first SPO tuple relationship information in a second storage; performing embedding on the dependent syntax relation information; recognizing second SPO tuple relationship information by inputting the embedded dependent syntax relationship information to a multi-layered bidirectional time series neural network model; and training the deep learning model by comparing the first SPO tuple relationship information stored in the second storage and the second SPO tuple relationship information.

According to still another aspect of the present invention, there is provided an apparatus for recognizing an SPO tuple relationship based on deep learning, including: a first storage configured to store a natural language sentence and an SPO tuple by configuring the natural language sentence and the SPO tuple in pairs; a memory configured to store a program for recognizing the SPO tuple relationship; and a processor configured to execute a program stored in the memory. In this case, as the processor executes the program, the processor reads the natural language sentence stored in the first storage and parses a dependent syntax to generate dependent syntax relationship information, reads the SPO tuple paired with the natural language sentence stored in the first storage and generates dependent-syntax-based first SPO tuple relationship information for training the deep learning model based on the SPO tuple, the natural language sentence, and the dependent syntax relationship information, and performs embedding on the dependent syntax relationship information, inputs the embedded dependent syntax relationship information to a multi-layered bidirectional time series neural network model to recognize second SPO tuple relationship information, and compares the first and second SPO tuple relationship information to train the deep learning model.

A computer program according to another aspect of the present invention for solving the above-described problems is combined with a computer, which is hardware, to execute the method of estimating arterial blood pressure based on deep learning and is stored in a computer-readable recording medium.

Other specific details of the invention are contained in the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Various advantages and features of the present invention and methods accomplishing them will become apparent from the following description of embodiments with reference to the accompanying drawings. However, the present invention is not limited to the embodiments disclosed herein but will be implemented in various forms. The embodiments serve to make the present invention thorough and are provided so that those skilled in the art can easily understand the scope of the present invention. Therefore, the present invention will be defined by the scope of the appended claims.

Terms used in the present specification are for explaining the embodiments rather than limiting the present invention. In the present invention, a singular form includes a plural form unless explicitly described to the contrary. Throughout this specification, the terms "comprise" and/or "comprising" will be understood to imply the inclusion of stated constituents but not the exclusion of any other constituents. Like reference numerals refer to like elements throughout the specification and "and/or" includes each of the above-described components and includes all combinations thereof. Although "first," "second," and the like are used to describe various components, it goes without saying that these components are not limited by these terms. These terms are used only to distinguish one component from other components. Therefore, it goes without saying that the first component described below may be the second component within the technical scope of the present invention.

Unless otherwise defined, all terms (including technical and scientific terms) used in the present specification have the same meaning as meanings commonly understood by those skilled in the art to which the present invention pertains. In addition, terms as defined in a commonly used dictionary are not to be ideally or excessively interpreted unless explicitly defined otherwise.

The present invention relates to a method and apparatus 100 for recognizing a subject-predicate-object (SPO) tuple relationship based on deep learning and, more specifically, is to recognize the SPO tuple relationship from a natural language sentence based on deep learning.

Hereinafter, a method of recognizing an SPO tuple relationship according to an embodiment of the present invention will be described with reference to FIG. 1.

Figure 1:
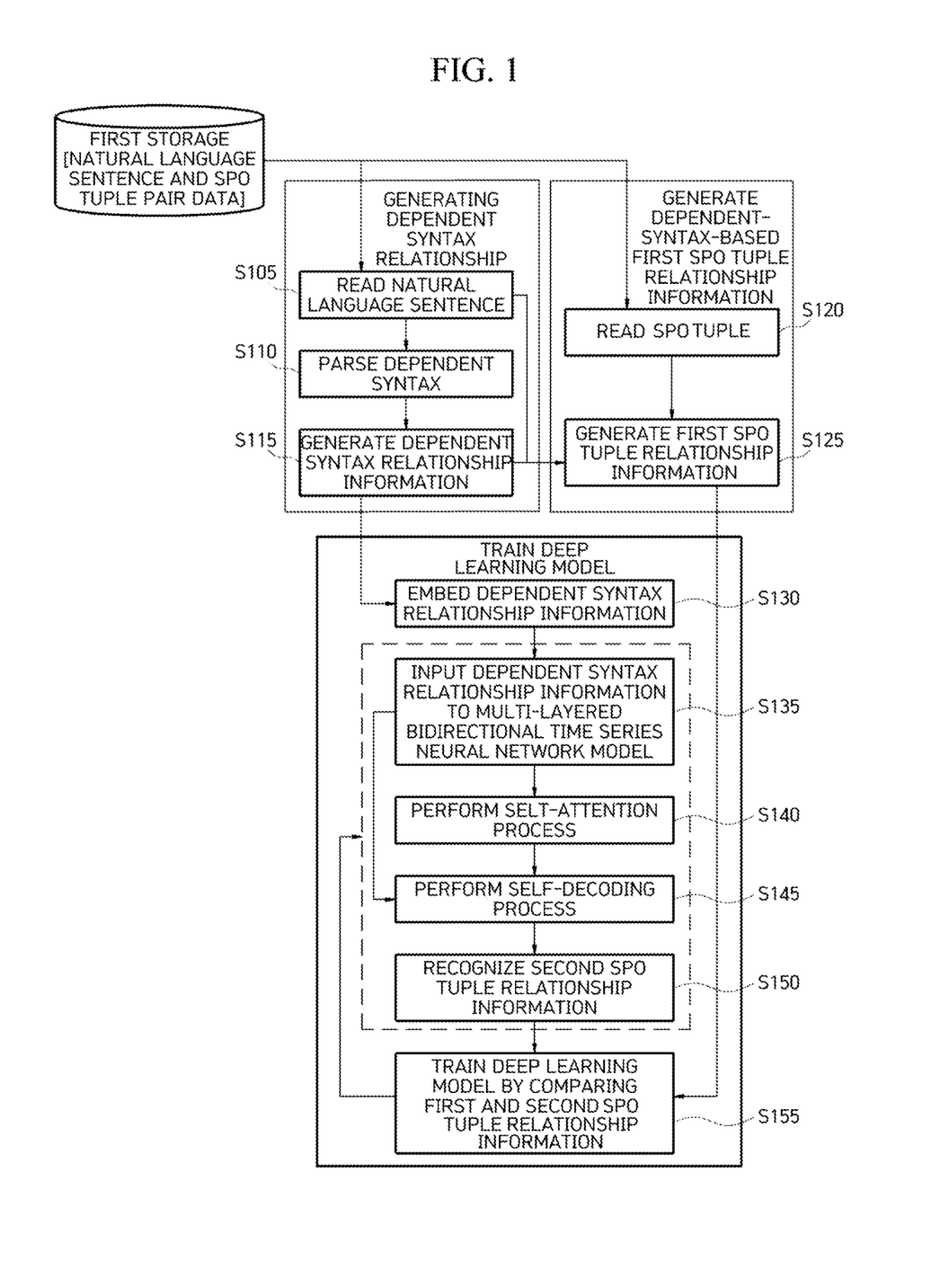
FIG. 1 is a flowchart of a method of recognizing a subject-predicate-object (SPO) tuple relationship according to an embodiment of the present invention.

FIG. 1 is a flowchart of a method of recognizing an SPO tuple relationship according to an embodiment of the present invention.

A method of recognizing an SPO tuple relationship based on deep learning according to the embodiment of the present invention includes: reading a natural language sentence stored in a first storage in which a natural language sentence and an SPO tuple are configured in pairs and stored; generating dependent syntax relationship information by parsing a dependent syntax from the natural language sentence; reading the SPO tuple paired with the natural language sentence stored in the first storage; generating dependent-syntax-based first SPO tuple relationship information for training a deep learning model based on the SPO tuple, the natural language sentence, and the dependent syntax relationship information; performing embedding on the dependent syntax relation information; recognizing second SPO tuple relationship information by inputting the embedded dependent syntax relationship information to a multi-layered bidirectional time series neural network model; and training the deep learning model by comparing the first and second SPO tuple relationship information.

Meanwhile, each operation illustrated in FIG. 1 may be understood to be performed by the apparatus 100 for recognizing an SPO tuple relationship to be described below, but is not necessarily limited thereto.

In one embodiment of the present invention, in order to train a deep learning model in a supervised learning method, natural language sentences and SPO tuples are stored in pairs in the first storage.

The natural language sentence is read from the first storage (S105), and a dependent syntax is parsed from the natural language sentence (S110) to generate dependent syntax relationship information for the natural language sentence (S115).

Next, the SPO tuple paired with the natural language sentence stored in the first storage is read (S120), and dependent-syntax-based first SPO tuple relationship information for supervised learning of the deep learning model based on the SPO tuple, the natural language sentence, and the dependent syntax relationship information is generated (S125).

Next, for the training of the deep learning model, embedding is performed by receiving the dependent syntax relationship information generated in operation S115 (S130), and the embedded dependent syntax relationship information is input to the multi-layered bidirectional time series neural network model (S135) to recognize the second SPO tuple relationship information. In this case, as an example of the dependent syntax relationship embedding, an embedding method such as Skip-gram may be used.

Meanwhile, the multi-layered bidirectional time series neural network model may be modeled as shown in Equation 1 below based on long short-term memory (LSTM).

$$\vec{h}_t^n = H\left(W_{\vec{h}^{n-1}\vec{h}^n}\vec{h}_t^{n-1} + W_{\vec{h}^n\vec{h}^n}\vec{h}_{t-1}^n + b\frac{n}{h}\right)$$

$$\overleftarrow{h}_t^n = H\left(W_{\overleftarrow{h}^{n-1}\overleftarrow{h}^n}\overleftarrow{h}_t^{n-1} + W_{\overleftarrow{h}^n\overleftarrow{h}^n}\overleftarrow{h}_{t+1}^n + b\frac{n}{h}\right)$$

$$h_t^n = \Phi\left(\vec{h}_t^N, \overleftarrow{h}_t^N\right)$$

[Equation 1]

In Equation 1, $\vec{h}_t^n$ denotes a forward hidden state at time step t of an $n^{th}$ layer (here, 1≤n≤N), and $$(\vec{h}_t^N)$$

denotes a backward hidden state at the time step t of the $n^{th}$ layer. $h_t^N$ denotes a hidden state in which the forward hidden state $(\vec{h}_t^N)$ and the backward hidden state $$(\overleftarrow{h}_t^N)$$

at the time step t are integrated in a last layer ($n^{th}$ layer) of the multi-layered bidirectional time series neural network model.

In order to recognize the second SPO tuple relationship information, it is necessary to perform a self-attention process (S140) and a self-decoding process (S145).

In one embodiment, the self-attention process is performed on the hidden state of the last layer of the multi-layered bidirectional time series neural network model based on Equation 2 below (S140).

$$m_t = \begin{cases} 0 & (t \leq len(\text{sentence})) \\ -Inf & (t > len(\text{sentence})) \end{cases}$$

$$a_t = \tanh\{W_a(h_t^N \cdot h_T^N) + b_a\} \odot m_t$$

$$v_t = h_t^N \cdot \frac{\exp(a_t)}{\sum_{j=1}^T \exp(a_j)}$$

[Equation 2]

The self-attention process (S140) first calculates an attention score $\alpha_t$ at the time step t based on an attention mask $m_t$ at time step t and the hidden state of the last layer of the multi-layered bidirectional time series model.

Next, an attention value $v_t$ is calculated based on the attention score $\alpha_t$ and the hidden state of the last layer of the multi-layered bidirectional time series neural network model.

After the self-attention process is performed, the self-decoding is performed on the hidden state of the last layer of the multi-layered bidirectional time series neural network model (S145).

The self-decoding process in the time step t is performed by integrating the attention value calculated in the self-attention process and the hidden state of the last layer of the multi-layered bidirectional time series neural network model and may be modeled as Equation 3 below.

$$d_t = \phi(v_t, hN/T)$$

[Equation 3]

Here, $d_t$ denotes a self-decoding vector at the time step t.

When the self-attention process and the self-decoding process are completed, the second SPO tuple relationship information is recognized (S150).

In operation S150, based on Equation 4, a score of an SPO tuple relationship class is calculated using a multi-layered feed-forward neural network and a fully connected network for the self-decoding vector. Next, by performing a softmax on the score of the SPO tuple relationship class, probability values for each SPO tuple relationship class are generated as the second SPO tuple relationship information.

$$f_i^k = \sigma^k\left(\sum_{j=1}^{J^k} w_{i,j}^k f_j^{k-1} + b^k\right)$$

$$c_n = \sigma\left(\sum_{m=1}^M w_{n,m} f_m^L + b\right)$$

$$y_n = \frac{\exp(c_n)}{\sum_{j=1}^N \exp(c_j)}$$

[Equation 4]

Referring to Equation 4, $f_i^k$ denotes an $i^{th}$ activation function result of a $k^{th}$ layer in the multi-layered feed-forward neural network, $c_n$ denotes an $n^{th}$ activation function result in the fully connected network, and $y_n$ denotes a softmax result of an $n^{th}$ value in the fully connected network.

Next, the deep learning model is trained by comparing the first and second SPO tuple relationship information (S155).

In operation S155, SPO tuple relationship recognition accuracy is compared by performing one-hot encoding on the probability values for each SPO tuple relationship class generated with the second SPO tuple relationship information and the first SPO tuple relationship information. Then, parameters of the deep learning model are modified based on the comparison result and then applied to the deep learning model.

A method of recognizing SPO tuple relationship according to another embodiment of the present invention will be described with reference to FIG. 2.

Figure 2:
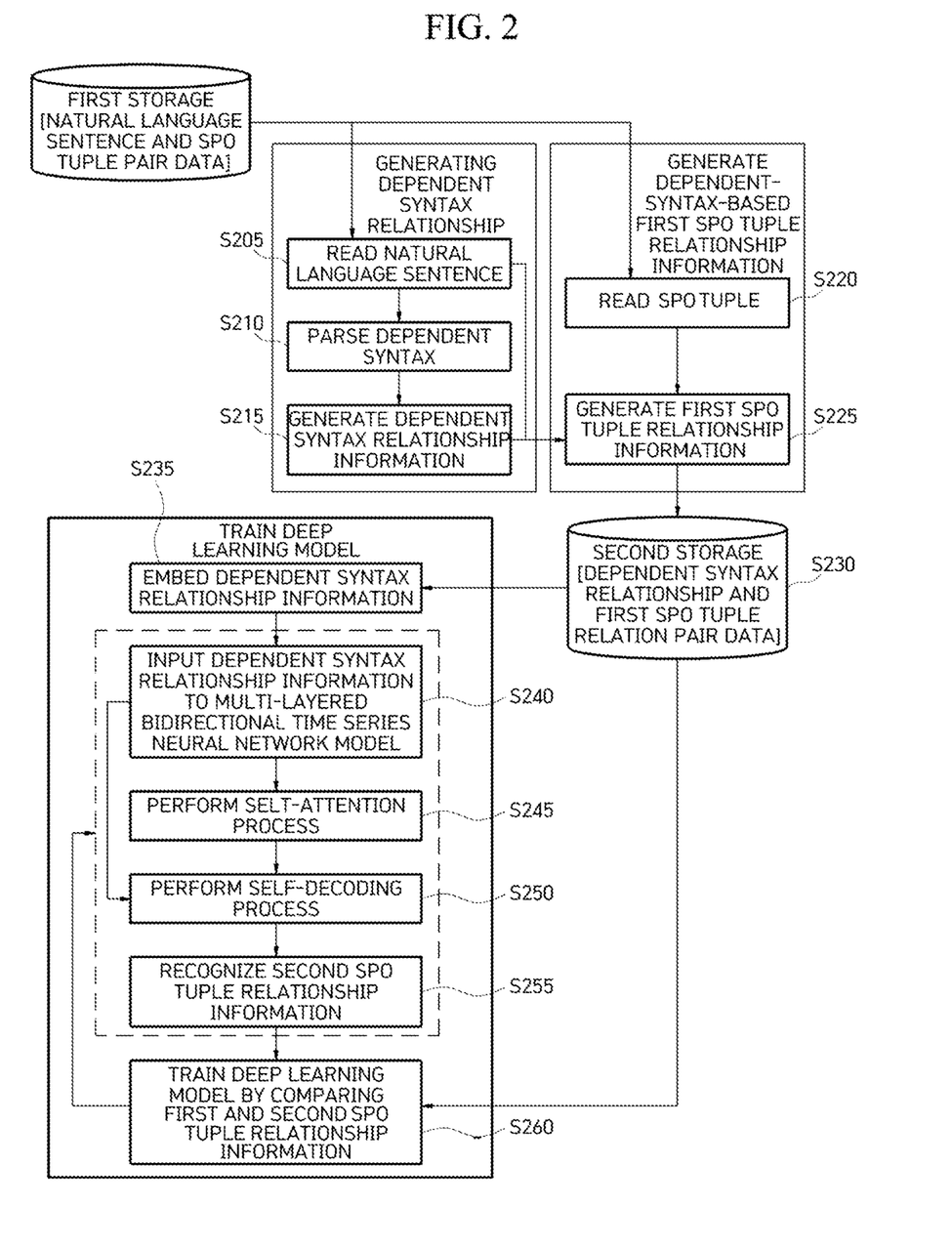
FIG. 2 is a flowchart of a method of recognizing an SPO tuple relationship according to another embodiment of the present invention.

FIG. 2 is a flowchart of a method of recognizing SPO tuple relationship according to another embodiment of the present invention.

A method of recognizing an SPO tuple relationship based on deep learning according to the embodiment of the present invention includes: reading a natural language sentence stored in a first storage in which a natural language sentence and an SPO tuple are configured in pairs and stored; generating dependent syntax relationship information by parsing a dependent syntax from the natural language sentence; reading the SPO tuple paired with the natural language sentence stored in the first storage; generating dependent-syntax-based first SPO tuple relationship information for training a deep learning model based on the SPO tuple, the natural language sentence, and the dependent syntax relationship information; configuring the dependent syntax relationship information and the first SPO tuple relationship information in pairs and storing the configured dependent syntax relationship information and first SPO tuple relationship information in a second storage; performing embedding on the dependent syntax relation information; recognizing second SPO tuple relationship information by inputting the embedded dependent syntax relationship information to a multi-layered bidirectional time series neural network model; and training the deep learning model by comparing the first SPO tuple relationship information stored in the second storage and the second SPO tuple relationship information.

In this case, the method of recognizing an SPO tuple relationship in FIG. 2 is different from the method of recognizing an SPO tuple relationship of FIG. 1 in that the method additionally performs a process of configuring dependent syntax relationship information and first SPO tuple relationship information in pairs and storing the configured dependent syntax relationship information and first SPO tuple relationship information in a second storage, and except for this process, other technical configurations are common to each other, and therefore, the overlapping content thereof will be omitted.

Meanwhile, each operation illustrated in FIG. 2 may be understood to be performed by the apparatus 100 for recognizing SPO tuple relationship to be described below but is not necessarily limited thereto.

First, in order to train the deep learning model with the supervised learning method, natural language sentences and SPO tuples are stored in the first storage in pairs, and the natural language sentences are read from the first storage (S205), and dependent syntax parsing is performed on the natural language sentences (S210) to generate dependent syntax relationship information for the natural language sentence (S215).

Next, the SPO tuple paired with the natural language sentence stored in the first storage is read (S220), and dependent-syntax-based first SPO tuple relationship information for supervised learning of the deep learning model based on the SPO tuple, the natural language sentence, and the dependent syntax relationship information is generated (S225).

Next, the dependent syntax relationship information and the first SPO tuple relationship information are configured in pairs and stored in the second storage (S230). In operation S230, operations S205 to S225 are repeatedly performed to configure the dependent syntax relationship information and the first SPO tuple relationship information according to the results of performing on all the natural language sentences and the SPO tuples stored in the first storage in pairs and store the configured dependent syntax relationship information and first SPO tuple relationship information in the second storage.

Next, for the training of the deep learning model, the embedding is performed by receiving the dependent syntax relationship information generated in operation S225 (S235), and the embedded dependent syntax relationship information is input to the multi-layered bidirectional time series neural network model (S240) to recognize the second SPO tuple relationship information.

In order to recognize the second SPO tuple relationship information, it is necessary to perform a self-attention process (S245) and a self-decoding process (S250).

In one embodiment, the self-attention process first calculates an attention score $\alpha_t$ at time step t based on an attention mask at the time step t and a hidden state of a last layer of the multi-layered bidirectional time series model.

Then, an attention value $v_t$ is calculated based on an attention score $\alpha_t$ and the hidden state of the last layer of the multi-layered bidirectional time series neural network model.

After the self-attention process is performed, the self-decoding is performed on the hidden state of the last layer of the multi-layered bidirectional time series neural network model (S250).

The self-decoding process at the time step t is performed by integrating the attention value calculated in the self-attention process and the hidden state of the last layer of the multi-layered bidirectional time series neural network model.

When the self-attention process (S245) and the self-decoding process (S250) are completed, the second SPO tuple relationship information is recognized (S255).

In operation S255, based on Equation 4, a score of an SPO tuple relationship class is calculated using a multi-layered feed-forward neural network and a fully connected network for the self-decoding vector. Next, by performing a softmax on the score of the SPO tuple relationship class, probability values for each SPO tuple relationship class are generated as the second SPO tuple relationship information.

Next, the deep learning model is trained by comparing the first SPO tuple relationship information stored in the second storage and the second SPO tuple relationship information (S260).

In operation S260, SPO tuple relationship recognition accuracy is compared by performing one-hot encoding on the probability values for each SPO tuple relationship class generated with the second SPO tuple relationship information and the first SPO tuple relationship information stored in the second storage. Then, parameters of the deep learning model are modified based on the comparison result and applied to the deep learning model.

Meanwhile, in the above description, operations S105 to S260 may be further divided into additional operations or combined into fewer operations according to an embodiment of the present invention. Also, some steps may be omitted if necessary, and an order between the operations may be changed. In addition, even when other content is omitted, the content of FIGS. 1 to 2 is also applied to the apparatus 100 for recognizing SPO tuple relationship based on deep learning of FIG. 3 to be described below.

Hereinafter, the apparatus 100 for recognizing an SPO tuple relationship according to the embodiment of the present invention will be described with reference to FIG. 3.

Figure 3:
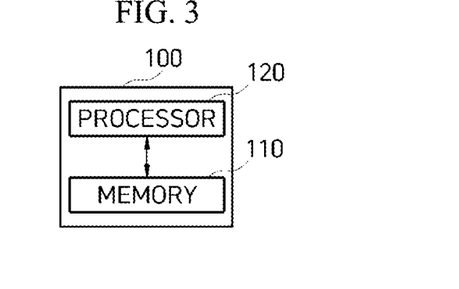
FIG. 3 is a block diagram of an apparatus for recognizing an SPO tuple relationship according to an embodiment of the present invention.

FIG. 3 is a block diagram of the apparatus 100 for recognizing an SPO tuple relationship according to the embodiment of the present invention.

The apparatus 100 for recognizing an SPO tuple relationship according to the embodiment of the present invention includes a memory 110 and a processor 120.

The memory 110 includes a first storage in which natural language sentences and SPO tuples are configured in pairs. In addition, according to the embodiment, the memory 110 may include a second storage for storing the dependent syntax relationship information and the first SPO tuple relationship information that are configured in pair. A program for recognizing the SPO tuple relationship is stored in the memory 110. In this case, the memory 110 collectively refers to a non-volatile storage device that continuously maintains stored information even when power is not supplied and a volatile storage device.

For example, the memory 110 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as a compact disc read-only memory (CD-ROM) and a digital versatile disc read-only memory (DVD-ROM).

As the processor 120 executes the program stored in the memory 110, the processor 120 reads the natural language sentence stored in the first storage and parses the dependent syntax to generate the dependent syntax relationship information. Then, the processor 120 reads the SPO tuple paired with the natural language sentence stored in the first storage and generates the dependent-syntax-based first SPO tuple relationship information for the training of the deep learning model based on the SPO tuple, the natural language sentence, and the dependent syntax relationship information.

Thereafter, the processor 120 performs the embedding on the dependent syntax relationship information, inputs the embedded dependent syntax relationship information to the multi-layered bidirectional time series neural network model to recognize the second SPO tuple relationship information, and compares the first and second SPO tuple relationship information to train the deep learning model.

Meanwhile, the processor 120 may use the second storage according to the embodiment. In this case, the dependent syntax relationship information and the first SPO tuple relationship information are configured in pairs and the deep learning model may be trained by comparing the first SPO tuple relationship information stored in the second storage and the second SPO tuple relationship information.

Figure 4:
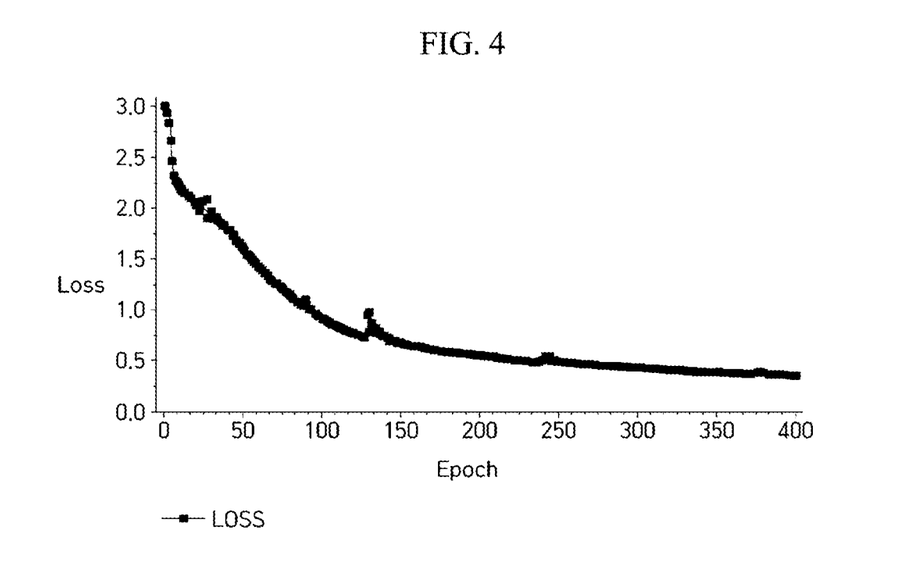
FIGS. 4 and 5 are diagrams illustrating results of a testing method and apparatus for recognizing an SPO tuple relationship based on deep learning according to an embodiment of the present invention.
Figure 5:
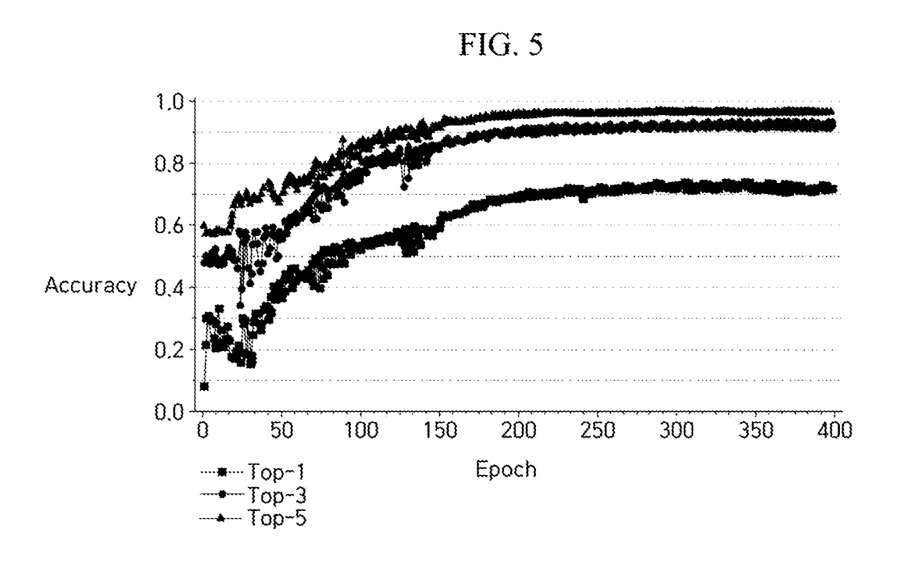

FIGS. 4 and 5 are diagrams illustrating the results of testing the method and apparatus 100 for recognizing an SPO tuple relationship based on deep learning according to the embodiment of the present invention.

After performing deep learning supervised learning for recognizing an SPO tuple relationship for natural language sentences based on the method and apparatus 100 for recognizing an SPO tuple relationship based on deep learning according to the embodiment of the present invention, the result of applying 7,000 pieces of training data to deep learning model is as illustrated in FIG. 4.

Referring to FIG. 4, it may be confirmed that, even when the amount of training data is small, as an epoch increases, the loss for recognizing the SPO tuple relationship decreases.

In addition, the accuracy of the SPO tuple relationship extracted from the natural language sentences using 3,000 pieces of evaluation data based on the deep learning model being trained is as illustrated in FIG. 5.

Referring to FIG. 5, it may be confirmed that, even when the training is performed with the small amount of learning data and then the evaluation test is performed, as the epoch increases, the accuracy of recognizing the SPO tuple relationship also increases and the accuracy increases.

The above-described embodiment of the present invention may be embodied as a program (or application) and stored in a medium for execution in combination with a computer which is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module 110 of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

The above description of the present invention is for illustrative purposes, and those skilled in the art to which the present invention pertains will understand that it may be easily modified to other specific forms without changing the technical spirit or essential features of the present invention. Therefore, it is to be understood that the exemplary embodiments described hereinabove are illustrative rather than being restrictive in all aspects. For example, each component described as a single type may be implemented in a distributed manner, and similarly, components described as distributed may be implemented in a combined form.

According to the above-described embodiment of the present invention, it is possible to recognize an SPO tuple relationship of a natural language with high accuracy even in the case in which there is a small amount of training data and an uncomplicated deep learning model by training a deep learning model using a multi-layered bidirectional time series neural network model, a self-attention process, a self-decoding process, and an SPO tuple relationship recognition process based on a dependent syntax to recognizing the SPO tuple relationship of the natural language sentences.

In addition, there is an advantage that the deep learning model on which the training is performed does not depend on a specific domain and can be applied to other domains.

Effects of the present invention are not limited to the above-described effects, and other effects that are not described will be clearly understood by those skilled in the art from the following descriptions.

It is to be understood that the scope of the present invention will be defined by the claims rather than the above-described description and all modifications and alternations derived from the claims and their equivalents are included in the scope of the present invention.

What is claimed is:

1. A method of recognizing a subject-predicate-object (SPO) tuple relationship based on deep learning that is executed by a computer, the method comprising:
    reading a natural language sentence stored in a first storage in which a natural language sentence and an SPO tuple are configured in pairs and stored:
    parsing a dependent syntax from the natural language sentence to generate dependent syntax relationship information;
    reading the SPO tuple paired with the natural language sentence stored in the first storage;
    generating dependent-syntax-based first SPO tuple relationship information for training a deep learning model based on the SPO tuple, the natural language sentence, and the dependent syntax relationship information;

performing embedding on the dependent syntax relationship information;

recognizing second SPO tuple relationship information by inputting the embedded dependent syntax relationship information to a multi-layered bidirectional time series neural network model; and training the deep learning model by comparing the first and second SPO tuple relationship information, wherein the recognizing of the second SPO tuple relationship information by inputting the embedded dependent syntax relationship information to the multi-layered bidirectional time series neural network model includes:

calculating a score of an SPO tuple relationship class using a multi-layer forward neural network and a fully connected network for a self-decoding vector according to the self-decoding result; and generating probability values for each SPO tuple relationship class with the second SPO tuple relationship information by performing a softmax on the score of the SPO tuple relationship class;

wherein the training of the deep learning model by comparing the first and second SPO tuple relationship information includes:

comparing SPO tuple relationship recognition accuracy using the probability value for the SPO tuple relationship class and the first SPO tuple relationship information; and training the deep learning model by modifying and applying a parameter of the deep learning model based on the comparison result.

2. The method of claim 1, wherein the recognizing of the second SPO tuple relationship information by inputting the embedded dependent syntax relationship information to the multi-layered bidirectional time series neural network model includes:

performing a self-attention process on a hidden state of a last layer of the multi-layered bidirectional time series neural network model; and performing self-decoding on the hidden state of the last layer of the multi-layered bidirectional time series neural network model, wherein the performing of the self-attention process on the hidden state of the last layer of the multi-layered bidirectional time series neural network model includes:

calculating an attention score based on an attention mask at the time step t and the hidden state of the last layer of the multi-layered bidirectional time series neural network model; and calculating an attention value based on the attention score and the hidden state of the last layer of the multi-layered bidirectional time series neural network model, wherein, in the performing of the self-decoding on the hidden state of the last layer of the multi-layered bidirectional time series neural network model, the self-decoding is performed at the time step t by integrating the attention value and the hidden state of the last layer of the multi-layered bidirectional time series neural network model.

3. The method of claim 2, wherein the hidden state of the last layer of the multi-layered bidirectional time series neural network model is a hidden state in which a forward hidden state and a backward hidden state are integrated at a time step t of a last layer in an nth layer.

4. A method of recognizing a subject-predicate-object (SPO) tuple relationship based on deep learning executed by a computer, the method comprising:

reading a natural language sentence stored in a first storage in which a natural language sentence and an SPO tuple are configured in pairs and stored;

generating dependent syntax relationship information by parsing a dependent syntax from the natural language sentence;

reading the SPO tuple paired with the natural language sentence stored in the first storage;

generating dependent-syntax-based first SPO tuple relationship information for training a deep learning model based on the SPO tuple, the natural language sentence, and the dependent syntax relationship information;

configuring the dependent syntax relationship information and the first SPO tuple relationship information in pairs and storing the configured dependent syntax relationship information and first SPO tuple relationship information in a second storage;

performing embedding on the dependent syntax relationship information;

recognizing second SPO tuple relationship information by inputting the embedded dependent syntax relationship information to a multi-layered bidirectional time series neural network model; and training the deep learning model by comparing the first SPO tuple relationship information stored in the second storage and the second SPO tuple relationship information, wherein the recognizing of the second SPO tuple relationship information by inputting the embedded dependent syntax relationship information to the multi-layered bidirectional time series neural network model includes:

calculating a score of an SPO tuple relationship class using a multi-layer forward neural network and a fully connected network for a self-decoding vector according to the self-decoding result; and generating probability values for each SPO tuple relationship class with the second SPO tuple relationship information by performing a softmax on the score of the SPO tuple relationship class, wherein the training of the deep learning model by comparing the first SPO tuple relationship information stored in the second storage and the second SPO tuple relationship information includes:

comparing SPO tuple relationship recognition accuracy using the probability value for the SPO tuple relationship class and the first SPO tuple relationship information stored in the second storage; and training the deep learning model by modifying and applying a parameter of the deep learning model based on the comparison result.

5. The method of claim 4, wherein the recognizing of the second SPO tuple relationship information by inputting the embedded dependent syntax relationship information to the multi-layered bidirectional time series neural network model includes:

performing a self-attention process on a hidden state of a last layer of the multi-layered bidirectional time series neural network model; and performing self-decoding on the hidden state of the last layer of the multi-layered bidirectional time series neural network model, wherein the performing of the self-attention process on the hidden state of the last layer of the multi-layered bidirectional time series neural network model includes:

calculating an attention score based on an attention mask at the time step t and the hidden state of the last layer of the multi-layered bidirectional time series neural network model; and calculating an attention value based on the attention score and the hidden state of the last layer of the multi-layered bidirectional time series neural network model, wherein, in the performing of the self-decoding on the hidden state of the last layer of the multi-layered bidirectional time series neural network model, the self-decoding is performed at the time step t by integrating the attention value and the hidden state of the last layer of the multi-layered bidirectional time series neural network model.

6. The method of claim 5, wherein the hidden state of the last layer of the multi-layered bidirectional time series neural network model is a hidden state in which a forward hidden state and a backward hidden state are integrated at a time step t of a last layer in an nth layer.

7. The method of claim 4, wherein, in the configuring of the dependent syntax relationship information and the first SPO tuple relationship information in pairs and the storing of the configured dependent syntax relationship information and first SPO tuple relationship information in the second storage, the dependent syntax relationship information and the first SPO tuple relationship information are configured in pairs according to a performing result on all natural language sentences and SPO tuples stored in the first storage, and stored in the second storage.

8. An apparatus for recognizing SPO tuple relationship based on deep learning, the apparatus comprising:

a first storage configured to store a natural language sentence and an SPO tuple by configuring the natural language sentence and the SPO tuple in pairs;

a memory configured to store a program for recognizing the SPO tuple relationship; and a processor configured to execute a program stored in the memory, wherein, as the processor executes the program, the processor reads the natural language sentence stored in the first storage and parses a dependent syntax to generate dependent syntax relationship information, reads the SPO tuple paired with the natural language sentence stored in the first storage and generates dependent-syntax-based first SPO tuple relationship information for training a deep learning model based on the SPO tuple, the natural language sentence, and the dependent syntax relationship information, and performs embedding on the dependent syntax relationship information, inputs the embedded dependent syntax relationship information to a multi-layered bidirectional time series neural network model to recognize second SPO tuple relationship information, and compares the first and second SPO tuple relationship information to train the deep learning model, wherein the process calculates a score of an SPO tuple relationship class using a multi-layer forward neural network and a fully connected network for a self-decoding vector according to the self-decoding result and generates probability values for each SPO tuple relationship class with the second SPO tuple relationship information by performing a softmax on the score of the SPO tuple relationship class, wherein the process compares SPO tuple relationship recognition accuracy using the probability value for the SPO tuple relationship class and the first SPO tuple relationship information and trains the deep learning model by modifying and applying a parameter of the deep learning model based on the comparison result.

\* \* \* \* \*